(No Model.)

M. V. B. ETHRIDGE.
RAILWAY RAIL JOINT FASTENING.

No. 345,421. Patented July 13, 1886.

Attest:
F. H. Schott
Fred E. Tasker

Inventor:
Martin V. B. Ethridge
per J. C. Tasker, atty.

UNITED STATES PATENT OFFICE.

MARTIN V. B. ETHRIDGE, OF BOSTON, MASSACHUSETTS, ASSIGNOR TO HENRY E. WAITE, OF SAME PLACE.

RAILWAY-RAIL-JOINT FASTENING.

SPECIFICATION forming part of Letters Patent No. 345,421, dated July 13, 1886.

Application filed July 16, 1885. Serial No. 171,756. (No model.)

*To all whom it may concern:*

Be it known that I, MARTIN V. B. ETHRIDGE, a citizen of the United States, residing at Boston, in the county of Suffolk and State of Massachusetts, have invented certain new and useful Improvements in Railway-Rail-Joint Fastenings; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to an improvement in bolt-fastenings to be used with the fish-bars of railways, or for binding firmly together the various parts of other structures, the object being to provide a fastening which cannot be loosened by the constant vibration of the structure, and which can yet be cheaply made and of such simple construction as to be quickly and easily secured in place; and my invention consists of a slotted bolt, a wedge-shaped washer, and a tapering wedge-piece adapted to enter the slot of the bolt, all of which are so combined in such a manner as will be hereinafter fully described.

Figure 1:
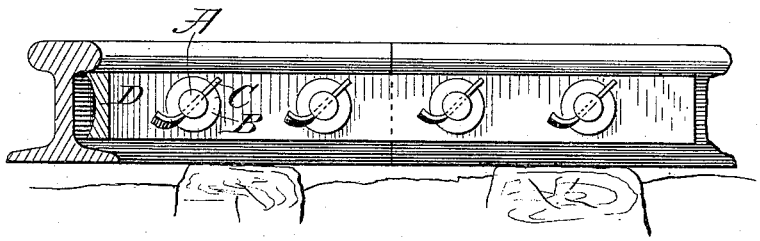
Figure 2:
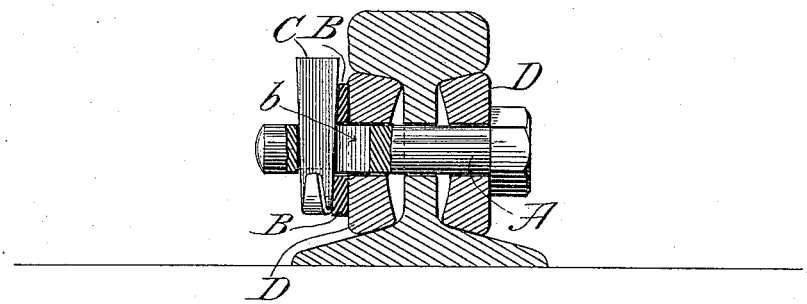
Figure 3:
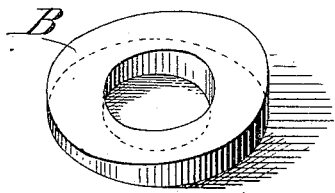
Figure 4:
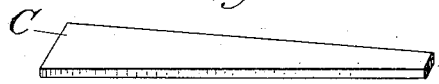

In the annexed drawings, illustrating my invention, Figure 1 is a perspective of a rail-joint, the fish-bars and rails being secured together by my improved fastening. Fig. 2 is a section of a rail and fish-bars similarly provided with my improved bolt-fastening. Fig. 3 is a perspective of the wedge-shaped washer, and Fig. 4 is a view of the wedge-piece.

Like letters indicate like parts.

A represents a bolt, of ordinary construction, provided near one end with a slot, *b*, extending lengthwise of the bolt any desired distance, as will be best seen by reference to Fig. 2, where a portion of the bolt has been broken away to show the length of this slot.

D D represent fish-bars situated in the usual manner, one on each side of the rail, and it will be seen that the said slot *b* is so situated as to have its beginning in that part of the bolt within the fish-bar, whence it may extend as far as desired in the direction of the end of the bolt, the purpose being to make this slot only of sufficient size and length to enable the wedge-piece to be driven through the bolt far enough to securely bind the wedge-shaped washer against the fish-bar, and thus immovably secure the whole combination of parts together.

B represents a washer formed of a wedging shape, as shown in Fig. 3 and in section in Fig. 1, and preferably constructed of circular form and having a circular aperture in the middle, which will correspond somewhat in size with the bolt upon which it is to be placed.

C designates a tapering wedge-piece made of iron, malleable or soft, or other suitable metal, so that it may be driven into the slot against the washer, and then, if desired, twisted or bent up at its end to secure it in place, as shown in Fig. 2.

In using this improved device for fastening bolts securely in position the bolt is first to be inserted through the fish-bars and rail or other devices which it is desired to fasten together. Then the washer is slipped over the outer end, and finally the wedge-piece C is driven through the slot and against the washer, which latter is made to bind firmly against the fish-bar. Thus with a wedge-shaped washer and a wedging-piece such as I have described a tight, secure clamp can be effected. Many advantages reside in the construction and use of this wedge-shaped washer. It combines in one piece a washer and a wedge, and avoids the trouble and expense of having a multiplicity of parts, such as is characteristic of some bolt-fastenings that have several wedging-pieces in addition to a washer. It is easily made and readily manipulated, and the clamp afforded thereby is durable, and is not weakened by constant jar, as in the case of bridges, or by intermittent jar, as in the case of railroads; and, further, it enables the fastening to present a neat appearance, for when the wedge has been driven into position its outside line will be parallel with the inside line of the washer, and a neat and well-shaped fastening will be presented to view, which is free from the angularities of many fastenings now in use.

It will be understood that although I have described my bolt-fastening in its application to railways, yet, however valuable it may be in this one particular application, it is not intended to confine it to that use exclusively;

but it is my purpose that it shall be used in the construction of bridges or any work where bolts are needed and perfect security required, for it can with great advantage replace the nut and screw-threaded bolts in almost every situation.

Having thus described my invention, what I claim as new, and desire to secure by Letters Patent, is—

1. A bolt-fastening consisting of the combination of the bolt A, having a slot, $b$, the wedge-shaped washer D, and the tapering wedge-piece C, substantially as shown and described.

2. In a railway-rail-joint fastening, the combination, with the fish-bars D D, of a slotted bolt, A, provided with wedge-shaped washer B and wedge-piece C, substantially as shown and described.

In testimony whereof I affix my signature in presence of two witnesses.

MARTIN V. B. ETHRIDGE.

Witnesses:
STEPHEN W. TROWBRIDGE,
CHAS. HALL ADAMS.